United States Patent [19]

Hironaka et al.

[11] Patent Number: 4,944,711
[45] Date of Patent: Jul. 31, 1990

[54] EXTENDABLE/RETRACTABLE OPERATIONAL SLEEVE

[75] Inventors: Yoshiaki Hironaka, Sayama; Isao Matsumoto, Koganei, both of Japan

[73] Assignee: Kioritz Corporation, Tokyo, Japan

[21] Appl. No.: 313,526

[22] Filed: Feb. 22, 1989

[30] Foreign Application Priority Data

Mar. 23, 1988 [JP] Japan .............................. 63-38212[U]

[51] Int. Cl.⁵ .............................. F16C 1/06; F16C 1/26
[52] U.S. Cl. ...................................... 464/52; 30/296.1; 464/162; 464/172
[58] Field of Search ..................... 30/276, 296.1, 347; 56/12.7, 17.5, 255, 256; 464/52, 162, 170, 172

[56] References Cited

U.S. PATENT DOCUMENTS

| H380 | 12/1987 | Yokocho | 30/276 |
|---|---|---|---|
| 1,733,072 | 10/1929 | Pierce | 464/172 X |
| 2,484,731 | 10/1949 | Pritchett | 464/172 |
| 2,540,552 | 2/1951 | Sheperdson et al. | 464/172 X |
| 3,696,597 | 10/1972 | Sitter . | |
| 3,795,281 | 3/1974 | Cloran | 30/296.1 X |
| 4,126,928 | 11/1978 | Hoff . | |
| 4,397,088 | 8/1983 | Hampel | 30/296.1 |
| 4,451,983 | 6/1984 | Johnson et al. | 464/52 X |
| 4,505,040 | 3/1985 | Everts | 30/296.1 |
| 4,654,971 | 4/1987 | Fettes et al. | 30/296.1 X |
| 4,714,447 | 12/1987 | Hironaka | 464/52 |
| 4,733,471 | 3/1988 | Rahe | 30/296.1 X |

FOREIGN PATENT DOCUMENTS 3213185 12/1986 Fed. Rep. of Germany .

Primary Examiner—Daniel P. Stodola
Attorney, Agent, or Firm—Browdy and Neimark

[57] ABSTRACT

An extendable/retractable operational sleeve is composed of a main sleeve portion and a movable sleeve portion movable in the axial direction in a telescopic manner relative to the main sleeve portion. A stop member for limiting outward separation of the movable sleeve portion of the operational sleeve is integrally formed with a bearing for supporting a main transmission shaft.

1 Claim, 2 Drawing Sheets

EXTENDABLE/RETRACTABLE OPERATIONAL SLEEVE

BACKGROUND OF THE INVENTION

The present invention relates to an extendable/retractable operational sleeve whose transmission shaft is supported to pass through the operational sleeve. In particular, the invention relates to an extendable/retractable operational sleeve used in a working machine such as a grass trimmer.

In a working machine such as a grass trimmer, in order to adjust a length of the operational sleeve suitable for an operator's work, a movable sleeve portion moved in the axial direction and engaged in a telescopic manner with the main sleeve portion is fixed relative to the main sleeve portion by a joint member, thereby adjusting the length of the overall operational sleeve as desired. A transmission shaft for transmitting a driving force from a motor such as an internal combustion engine disposed at a rear end portion of the main sleeve portion to a working tool such as a cutter blade mounted on a front end portion of the movable sleeve portion is supported by bearings within the main sleeve portion and the movable sleeve portion. A stop member for limiting a drawing or separation of the movable sleeve member is provided for preventing the movable sleeve portion from separating away from the main sleeve portion when the operational sleeve is extended. In such a conventional operational sleeve, the joint portion of the operational sleeve is rather complicated, which causes a disadvantage that manufacturing and assembling require a large amount of work and cost.

SUMMARY OF THE INVENTION

Accordingly, an object of the present invention is to provide an extendable/retractable operational sleeve which may overcome the disadvantage inherent in the prior art and is simple and convenient.

According to the present invention, there is provided an extendable/retractable operational sleeve comprising a main sleeve portion and a movable sleeve portion which is movable in an axial direction in a telescopic manner relative to the main sleeve portion, characterized in that a front end portion of said main sleeve portion is securedly fixed to a large diameter hole portion of a joint member; a rear end portion of the movable sleeve portion is inserted into a small diameter portion of the joint member; a stop member is fixed to the rear end portion of the movable sleeve portion; the stop member has a large diameter portion that is slidably engaged with the main sleeve portion in the axial direction and a shoulder portion engaged with a step portion at an inner end of the large diameter hole portion of said joint member for limiting outward separation of the movable sleeve portion; the main sleeve portion has therein a tubular main transmission shaft rotatably supported by a bearing mounted within the large diameter portion of the stop member; and a movable transmission shaft is supported rotatably within said movable sleeve portion and is movable together with the movable sleeve portion; an inner peripheral portion of the main transmission shaft is in the form of non-circular shape in cross section and a shaft joint member mounted on the movable transmission shaft has a complementary shape with the inner periphery of the main transmission shaft to thereby support the shaft joint member slidably in the axial direction within the main transmission shaft.

The stop member for limiting the outward separation of the movable members of the operational sleeve and the bearing for supporting the main transmission shaft are integrally formed with each other. It is possible to move these members in the axial direction together with the movable sleeve portion when the length adjustment of the operational sleeve. It is possible to transmit a drive force of the main transmission shaft to the movable transmission shaft while supporting the shaft joint portion without fail. The structure within the operational sleeve is simplified to perform readily the manufacture and assembly. Also, the movable transmission shaft is moved axially together with the movable sleeve portion during the adjustment of the length of the operational sleeve and is stably supported by the bearing as well as the main shaft, thereby preventing the abnormal vibration of the transmission shaft. It is possible to transmit the driving force of the main transmission shaft to the movable transmission shaft without fail.

PREFERRED EMBODIMENT OF THE INVENTION

An embodiment of the invention will now be described with reference to the accompanying drawings.

Figure 2:
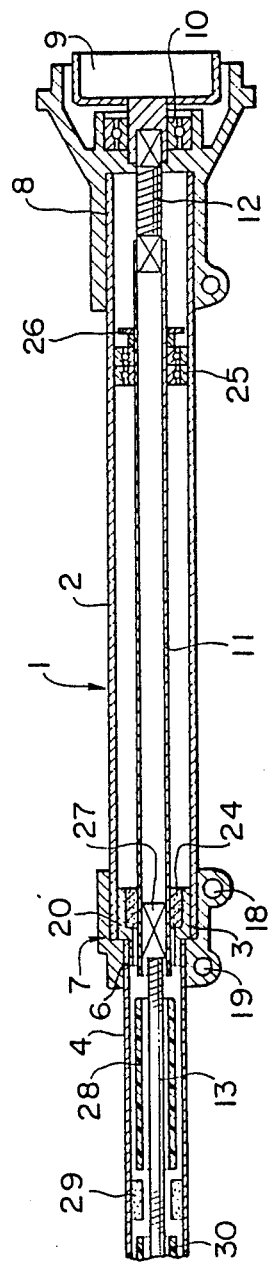
FIG. 2 is a schematic cross-sectional view of the operational sleeve from which the front end portion has been removed.
Figure 3:
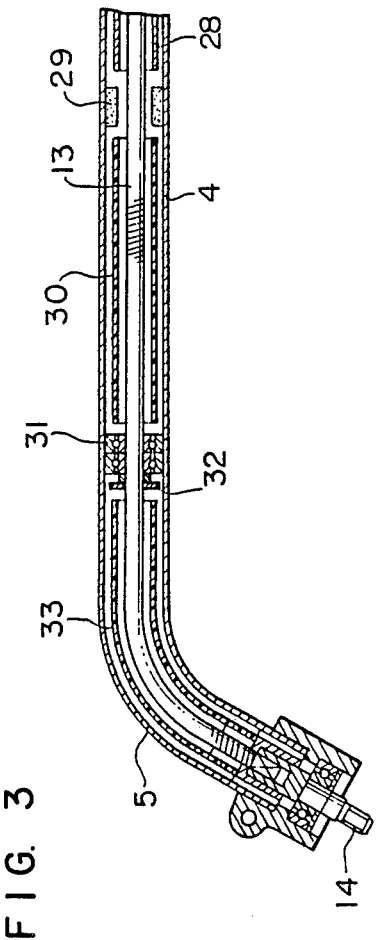
FIG. 3 is a schematic cross-sectional view of the removed front end portion of the operational sleeve in FIG. 2.

In the embodiment shown, the invention is applied to an operational sleeve 1 of a grass trimmer. As shown in FIGS. 2 and 3, the operational sleeve 1 comprises a straight, hollow tubular main sleeve portion 2 and a hollow tubular movable sleeve portion 4 which has a smaller outer diameter than an inner diameter of the main sleeve portion 2 and which extends from a front end portion 3 of the main sleeve portion 2 coaxially therewith. A front end portion 5 of the movable sleeve portion 4 is curved downwardly as shown in FIG. 3. The front end portion 3 of the main sleeve portion 2 and a straight rear end portion 6 of the movable sleeve portion 4 are movable relative to each other in a telescopic manner and may be fixedly secured to each other by a joint member 7 as will be described later. A clutch drum 9 of a centrifugal clutch which is capable of being drivingly coupled to a motor such as an internal combustion engine (not shown) is rotatably supported through a bearing 10 to a rear end portion 8 of the main sleeve portion 2. As will be described later, within the main sleeve portion 2, there are provided a rotatably supported, hollow main transmission shaft 11 and a vibration absorption type flexible transmission shaft 12 coupled between the clutch drum 9 and the main transmission shaft 11 for transmitting a driving torque from the clutch drum 9 to the main transmission shaft 11. Also, within the movable sleeve portion 4, there is rotatably provided a flexible movable transmission shaft 13 coupled to the main transmission shaft 11 to be movable in the axial direction as will be described later. The movable transmission shaft 13 is coupled to a work tool drive shaft 14 for a cutter blade or the like mounted on the front end portion 5 of the movable sleeve portion 4, so that the work tool drive shaft 14 is driven by the driving torque from the engine.

Figure 1:
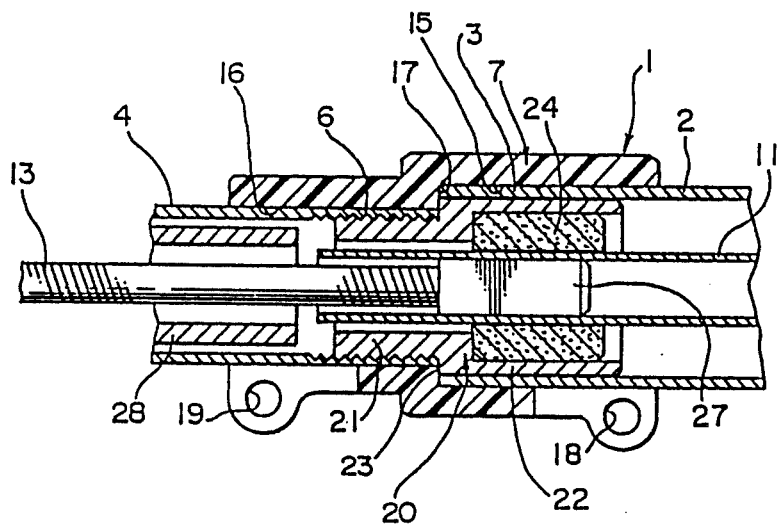
FIG. 1 is a cross-sectional view showing a primary part of an extendable/retractable operational sleeve according to one embodiment of the invention.

As shown in FIG. 1, a large diameter hole portion 15 and a small diameter hole portion 16 are coaxially formed within the joint member 7, and a step portion 17 is formed between the large diameter hole portion 15 and the small diameter hole portion 16. The front end portion 3 of the main sleeve portion 2 is inserted and received along the inner peripheral surface of the large diameter hole portion 15, whereas the rear end portion 6 of the movable sleeve portion 4 is inserted and received in the small diameter hole portion 16. The joint member 7 is integrally formed of suitable material such as synthetic resin. Split slots are formed on one side of the joint member 7, and lateral screw holes 18 and 19 are formed at both ends of the joint member 7 and on both sides of the split slots. The joint member 7 is firmly fixed at the inner peripheral surface of the large diameter hole portion 15 to the front end portion 3 of the main sleeve portion 2 by tightening a screw (not shown) into the screw hole 18 of the large diameter hole portion 15, so that the joint member 7 cannot be separated away from the main sleeve portion 2. In the same manner, the joint member 7 is firmly fixed at the inner peripheral surface of the small diameter hole portion 16 to the rear end portion 6 of the movable sleeve portion 4 by tightening a screw (not shown) into the screw hole 19 of the small diameter hole portion 16, so that the movable sleeve portion 4 is fixedly held relative to the main sleeve portion 2. The screw of the screw hole 19 is loosened to release the fixing force to the movable sleeve portion 4 and to move the sleeve portion 4 in the axial direction, thus adjusting the overall length of the operational sleeve 1.

A small diameter portion 21 of a sleeve-like stop member 20 made of aluminum alloy or the like is inserted into the rear end portion 6 of the movable sleeve portion 4 and is fixed by a suitable means such as screwing. The stop member 20 has an integrally formed large diameter portion 22 that extends outwardly from the rear end portion 6 of the movable sleeve portion 4 in the axial direction. The large diameter portion 22 is slidable in the axial direction along the inner peripheral surface of the front end portion 3 of the main sleeve portion 2. The stop member 20 has an annular shoulder portion 23 between the small diameter portion 21 and the large diameter portion 22. When the movable sleeve portion 4 is drawn forwardly from the main sleeve portion 2, the shoulder portion 23 is brought into abutment with the step portion 17 of the joint member 7 to limit the further draw of the movable sleeve portion 4 to thereby prevent the movable sleeve portion 4 from falling away from the main sleeve portion 2.

A suitable bearing means such as sintered oil-containing bearing 24 is mounted on the large diameter portion 22 of the stop member 20 and is adapted to slidingly contact with the cylindrical outer peripheral surface of the main transmission shaft 11 for supporting the latter rotatably and movably in the axial direction relative to the bearing. The main transmission shaft 11 is rotatably supported by a bearing 25 within the rear end portion of the main sleeve portion 2 and is provided with a push nut 26 located close to the bearing 25 for preventing the separation.

Although not shown in detail, the inner portion of the main transmission shaft 11 has a non-circular section such as a rectangular shape. A shaft joint member 27 having a complementary shape in cross section with the inner sectional shape of the transmission shaft 11 is mounted on the rear end portion of the movable transmission shaft 13. The shaft joint member 27 serves to transmit the driving torque to the movable transmission shaft 13 and may slide in the axial direction along the inner periphery of the main transmission shaft 11 in accordance with the movement of the movable sleeve portion 4.

Incidentally, if the shaft joint member 27 is provided at a location within the bearing 24 in the large diameter portion 22 of the stop member 20, it is possible to effectively prevent the generation of abnormal vibration at the joint portion between the main transmission shaft 11 and the movable transmission shaft 13. A tubular liner 28 made of synthetic resin such as Nylon or the like is provided within the rear end portion 6 of the movable sleeve portion 4. The tubular liner 28 serves to prevent the direct contact of the flexible transmission shaft 13 with the inner surface of the movable sleeve portion 4 when the movable transmission shaft 13 is curved during the rotational operation. A bearing 29 made of sintered alloy or the like is provided in front of the liner 28 within the movable sleeve portion 4. This bearing 29 is provided for the purpose of supporting the front end portion of the main transmission shaft 11 to stabilize and hold the latter when the movable sleeve portion 4 is inserted into the main sleeve portion 2 to shorten the overall length of the operational sleeve 1. Furthermore, within the movable sleeve portion 4, there are provided a liner 30 that is substantially the same as the liner 28, a ball bearing 31 for supporting the movable transmission shaft 13 in front of the liner 30, and a push nut 32 fixedly secured to the movable transmission shaft 13 in the vicinity of the ball bearing 31 for preventing the separation. Also, a liner 33 which is substantially the same as the liner 28 is provided within the front end portion 5 of the movable sleeve portion 4.

In the foregoing embodiment, the movable sleeve portion 4 has a curved form and the movable transmission shaft 13 passing therethrough is made of flexible material. It is however understood that the movable transmission shaft 13 may be made of a rigid rod-like material in the case where the operational sleeve 1 as a whole is formed in a straight shape.

What is claimed is:

1. An extendable/retractable operational sleeve comprising a main sleeve portion and a movable sleeve portion which is movable in an axial direction in a telescopic manner relative to said main sleeve portion, characterized in that a front end portion of said main sleeve portion is securedly fixed to a large diameter hole portion of a joint member; a rear end portion of said movable sleeve portion is inserted into a small diameter portion of said joint member; a stop member is fixed to the rear end portion of said movable sleeve portion; said stop member has a large diameter portion that is slidably engaged with said main sleeve portion in the axial direction and a shoulder portion engaged with a step portion at an inner end of the large diameter hole portion of said joint member for limiting outward separation of said movable sleeve portion; said main sleeve portion has therein a tubular transmission shaft rotatably supported by a bearing mounted within said large diameter portion of said stop member; and a movable transmission shaft is supported rotatably within said movable sleeve portion and is movable together with said movable sleeve portion; an inner peripheral portion of said main transmission shaft is in the form of non-circular shape in cross section and a shaft joint member mounted on said movable transmission shaft has a complementary shape with the inner periphery of said main transmission shaft to thereby support said shaft joint member slidably in the axial direction within said main transmission shaft.

* * * * *